United States Patent
Wang

(10) Patent No.: US 10,959,010 B1
(45) Date of Patent: Mar. 23, 2021

(54) EARPHONE DEVICE

(71) Applicant: Merry Electronics(Shenzhen) Co., Ltd., ShenZhen (CN)

(72) Inventor: Tsu-Jung Wang, New Taipei (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 0 days.

(21) Appl. No.: 16/790,674

(22) Filed: Feb. 13, 2020

(30) Foreign Application Priority Data

Nov. 19, 2019 (TW) .................................. 108141966

(51) Int. Cl.
 *H04R 1/10* (2006.01)
 *H04R 1/02* (2006.01)
 *G06F 3/0354* (2013.01)
 *H04R 5/033* (2006.01)

(52) U.S. Cl.
 CPC ........... *H04R 1/1041* (2013.01); *H04R 1/023* (2013.01); *H04R 1/1016* (2013.01); *G06F 3/03547* (2013.01); *H04R 5/033* (2013.01)

(58) Field of Classification Search
 CPC ........ H04R 1/10; H04R 1/1041; H04R 1/023; H04R 1/1016; H04R 5/033; H04R 5/04; H04R 2420/03; H04R 2420/05; G06F 3/03547
 USPC ................. 381/74, 26, 380, 384; 455/575.2; 345/177
 See application file for complete search history.

(56) References Cited

U.S. PATENT DOCUMENTS

| | | | | |
|---|---|---|---|---|
| 4,644,581 | A * | 2/1987 | Sapiejewski | H04R 1/1083 381/372 |
| 5,144,678 | A * | 9/1992 | Lenz | H04R 1/1041 381/371 |
| 7,925,029 | B2 * | 4/2011 | Hollemans | H04R 1/1041 381/74 |
| 8,213,668 | B2 * | 7/2012 | Tsao | H04R 1/1016 381/380 |
| 8,331,603 | B2 * | 12/2012 | Martenson | H04M 1/05 381/379 |
| 8,405,528 | B2 * | 3/2013 | Aghaei | G11B 19/08 341/33 |
| 8,447,058 | B1 * | 5/2013 | Sung | H04R 1/2826 381/373 |
| 9,042,571 | B2 * | 5/2015 | Dickins | G06F 3/04883 381/74 |
| 2010/0040245 | A1 * | 2/2010 | Buil | H04M 1/05 381/107 |

(Continued)

*Primary Examiner* — Xu Mei
(74) *Attorney, Agent, or Firm* — JCIPRNET

(57) ABSTRACT

An earphone device including a main body, a speaker, a control element, a pressure sensor, and a touch sensor is provided. The speaker is disposed in the main body for dividing the main body into a front chamber and a rear chamber. The control element is disposed in the rear chamber. The pressure sensor is disposed in the front chamber, is coupled to the control element, is configured to sense a pressure change in the front chamber, and accordingly generates a pressure-sensing signal. The touch sensor is disposed in the rear chamber, is coupled to the control element, is configured to sense a first external touch applied to the main body, and accordingly generates a first trigger-sensing signal. The control element automatically controls an action of the earphone device according to the pressure-sensing signal and the first trigger-sensing signal.

9 Claims, 4 Drawing Sheets

(56) References Cited

U.S. PATENT DOCUMENTS

| | | | | |
|---|---|---|---|---|
| 2013/0038458 A1* | 2/2013 | Toivola | ............... | H04M 1/05 |
| | | | | 340/665 |
| 2014/0348341 A1* | 11/2014 | Akaike | ............ | H04R 1/1041 |
| | | | | 381/74 |
| 2015/0201268 A1* | 7/2015 | Chang | ............... | H04R 1/1058 |
| | | | | 381/378 |
| 2017/0280223 A1* | 9/2017 | Cavarra | ............ | G06F 3/03547 |

* cited by examiner

EARPHONE DEVICE

CROSS-REFERENCE TO RELATED APPLICATION

This application claims the priority benefit of Taiwan application serial no. 108141966, filed on Nov. 19, 2019. The entirety of the above-mentioned patent application is hereby incorporated by reference herein and made a part of this specification.

BACKGROUND

Technical Field

The disclosure relates to an earphone device. In particular, the disclosure relates to an earphone device capable of automatically detecting a state in use.

Description of Related Art

Existing wireless earphones use physical buttons, and the earphones are turned on or off through the physical buttons. The disadvantage of using a physical button is that the user has to manually turn on or off the wireless earphones, which causes trouble in using the wireless earphones.

Nowadays, a type of wireless earphones which can be automatically turned on or off is developed. In a pair of wireless earphones of this type, a touch sensor is mounted on the outer surface of the pair of wireless earphones. When skin touch is detected by the touch sensor, it can be determined that whether the wireless earphones are worn in the ears, and the wireless earphones are then automatically turned on or off. Nevertheless, misjudgment may occur in wireless earphones adopting only one single touch sensor. For instance, when a finger touches the touch sensor, the touch sensor may misjudge that the wireless earphones are worn in the ears.

Accordingly, how wireless earphones can be developed to provide improved sensing accuracy to prevent misjudgment on the state in use is an important issue.

SUMMARY

The disclosure provides an earphone device providing improved sensing accuracy through a dual-detection mechanism so that misjudgment on a state in use by the earphone device is prevented.

The disclosure provides an earphone device including a main body, a speaker, a control element, a pressure sensor, and a touch sensor. The speaker is disposed in the main body for dividing the main body into a front chamber and a rear chamber. The control element is disposed in the rear chamber. The pressure sensor is disposed in the front chamber, is coupled to the control element, is configured to sense a pressure change in the front chamber, and accordingly generates a pressure-sensing signal. The touch sensor is disposed in the rear chamber, is coupled to the control element, is configured to sense a first external touch applied to the main body, and accordingly generates a first trigger-sensing signal. The control element automatically controls an action of the earphone device according to the pressure-sensing signal and the first trigger-sensing signal.

In an embodiment of the disclosure, the pressure sensor is coupled to the control element through a flexible circuit board to transmit the pressure-sensing signal to the control element.

In an embodiment of the disclosure, the touch sensor further includes a wear pad disposed on a first outer surface of the main body and coupled to the control element. When the first external touch is applied to the wear pad, the touch sensor is triggered by the wear pad and the first trigger-sensing signal is transmitted to the control element.

In an embodiment of the disclosure, the touch sensor further includes a press pad disposed on a second outer surface of the main body and coupled to the control element.

In an embodiment of the disclosure, when the pressure change sensed by the pressure sensor is greater than a predetermined value and the first external touch triggers the touch sensor, a microcontroller of the control element switches the press pad to a sensing state and the pressure sensor to a sleep state.

In an embodiment of the disclosure, when a second external force is applied to the press pad, the touch sensor is triggered by the press pad and a second trigger-sensing signal is transmitted to the control element for operating the earphone device.

In an embodiment of the disclosure, when the pressure change sensed by the pressure sensor is less than a predetermined value or the touch sensor is not triggered, a microcontroller of the control element switches the press pad to a sleep state and the pressure sensor to a sensing state.

In an embodiment of the disclosure, a sealing layer surroundingly disposed between the speaker and an inner surface of the main body is included, so that the front chamber and the rear chamber are not connected.

In an embodiment of the disclosure, a mesh disposed at a sound output hole of the main body is further included, and the front chamber is connected to an external environment through the mesh. A sound wave of the speaker is adapted to pass through the mesh and the sound output hole from the front chamber. Air of the external environment is adapted to enter the front chamber from the mesh.

In an embodiment of the disclosure, a distance between the pressure sensor and the speaker is at least 1 mm.

To sum up, the earphone device provided by the disclosure includes the pressure sensor and the touch sensor, so that the pressure change in the front chamber and the first external touch applied to the main body may be simultaneously sensed and are converted into the pressure-sensing signal and the first trigger-sensing signal. The control element receives and reads the pressure-sensing signal and the first trigger-sensing signal. When one of the pressure-sensing signal and the first trigger-sensing signal does not satisfy a predetermined condition, an original state is maintained. When the predetermined condition is satisfied, the control element automatically controls an action of the earphone device, and that the earphone device is switched to another state. In the disclosure, through the dual-detection mechanism performed by the pressure sensor and the touch sensor, the environment may be accurately sensed and misjudgment on a state in use by the earphone device is prevented.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
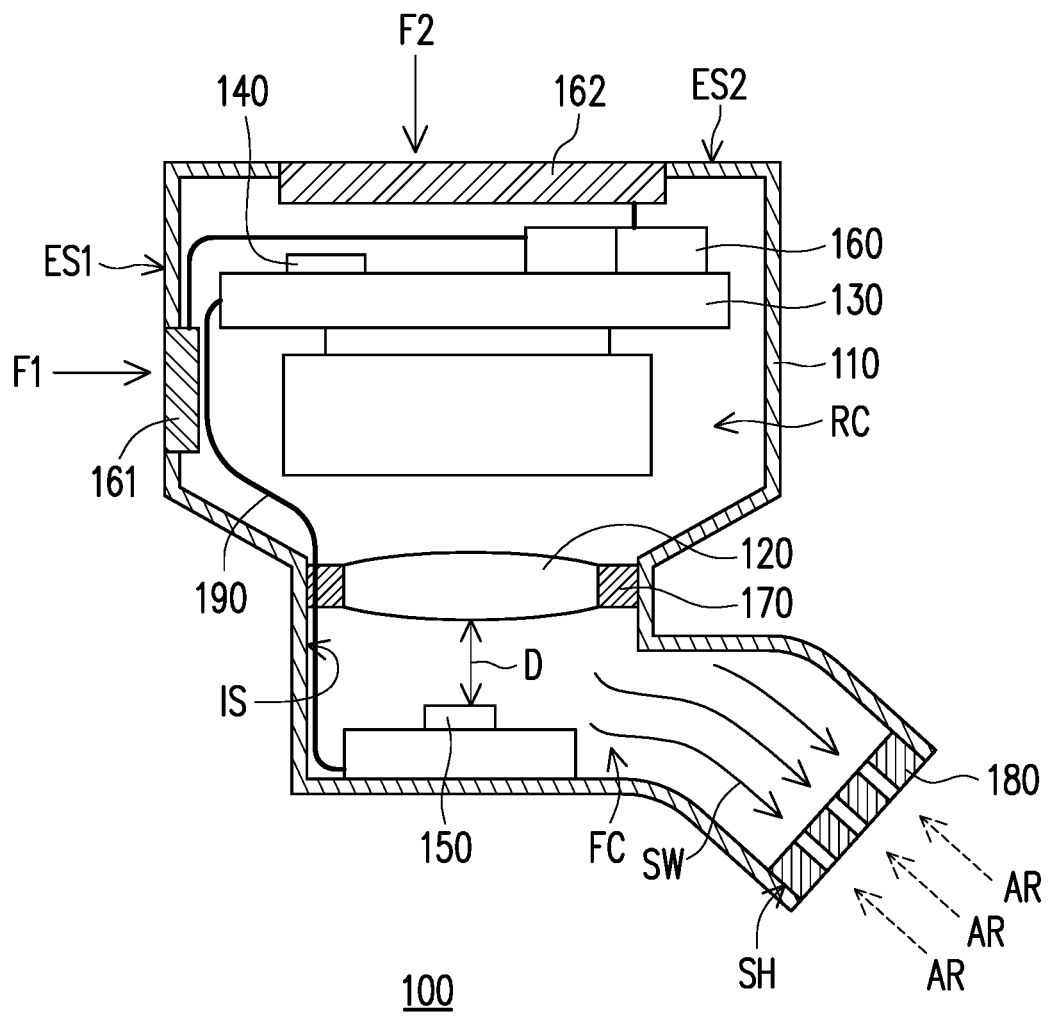
FIG. 1A is a schematic plan view of an earphone device according to an embodiment of the disclosure.
Figure 1B:
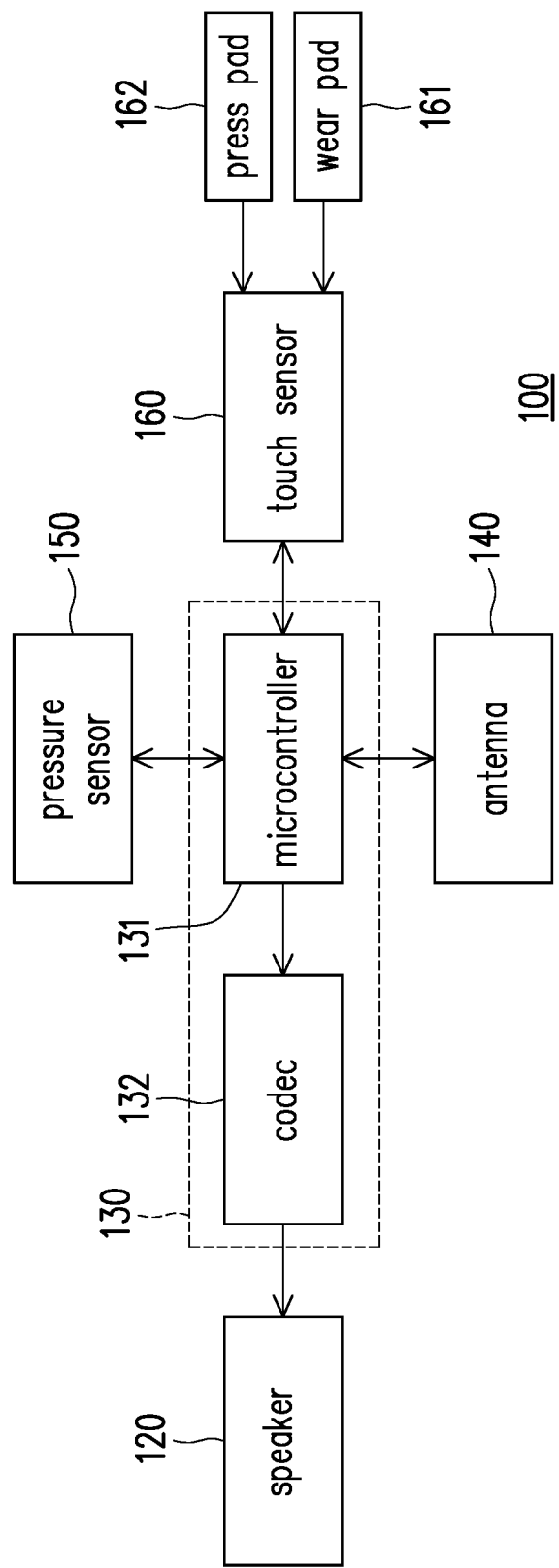
FIG. 1B is schematic block view of elements of the earphone device of FIG. 1A.
Figure 1C:
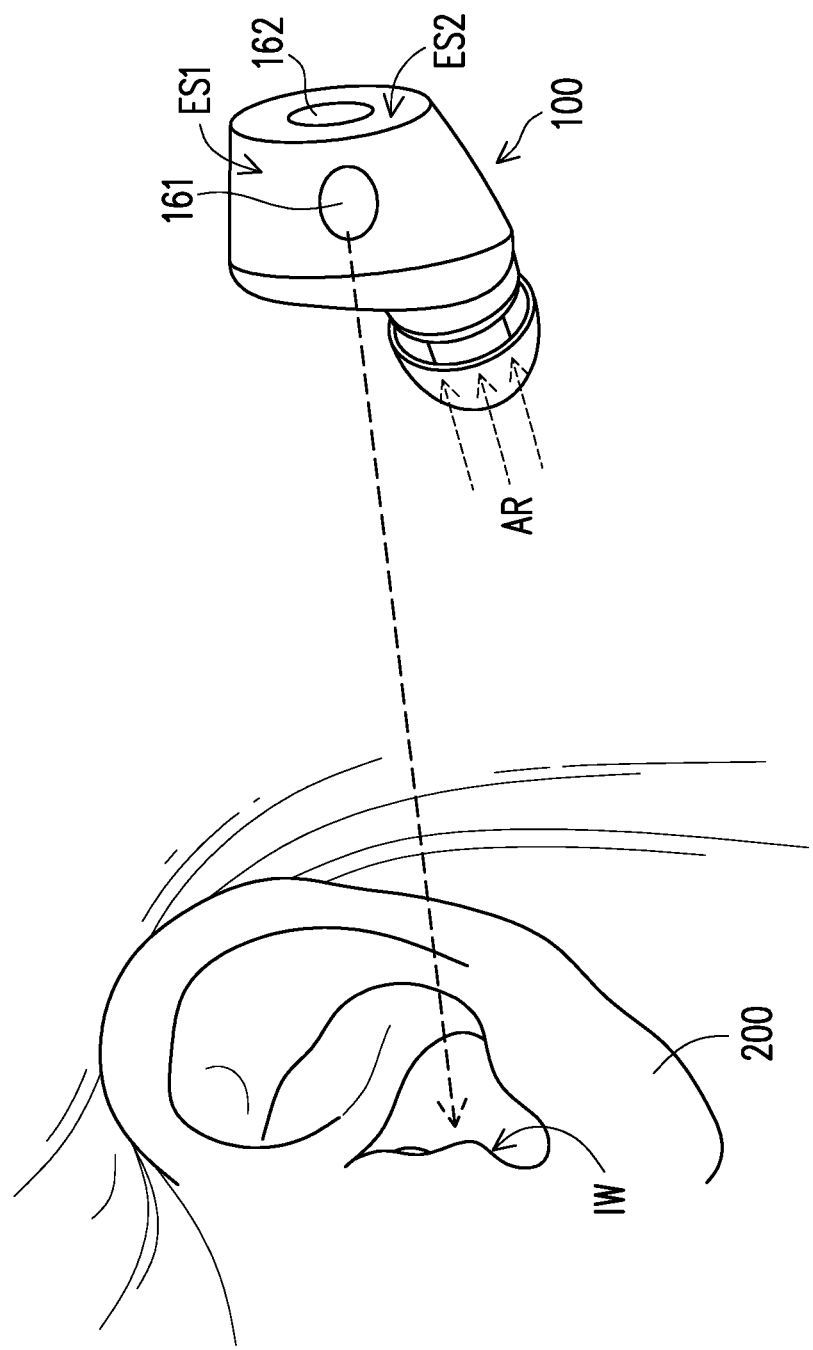
FIG. 1C is a schematic three-dimensional view of the earphone device of FIG. 1A corresponding to an ear.
Figure 2:
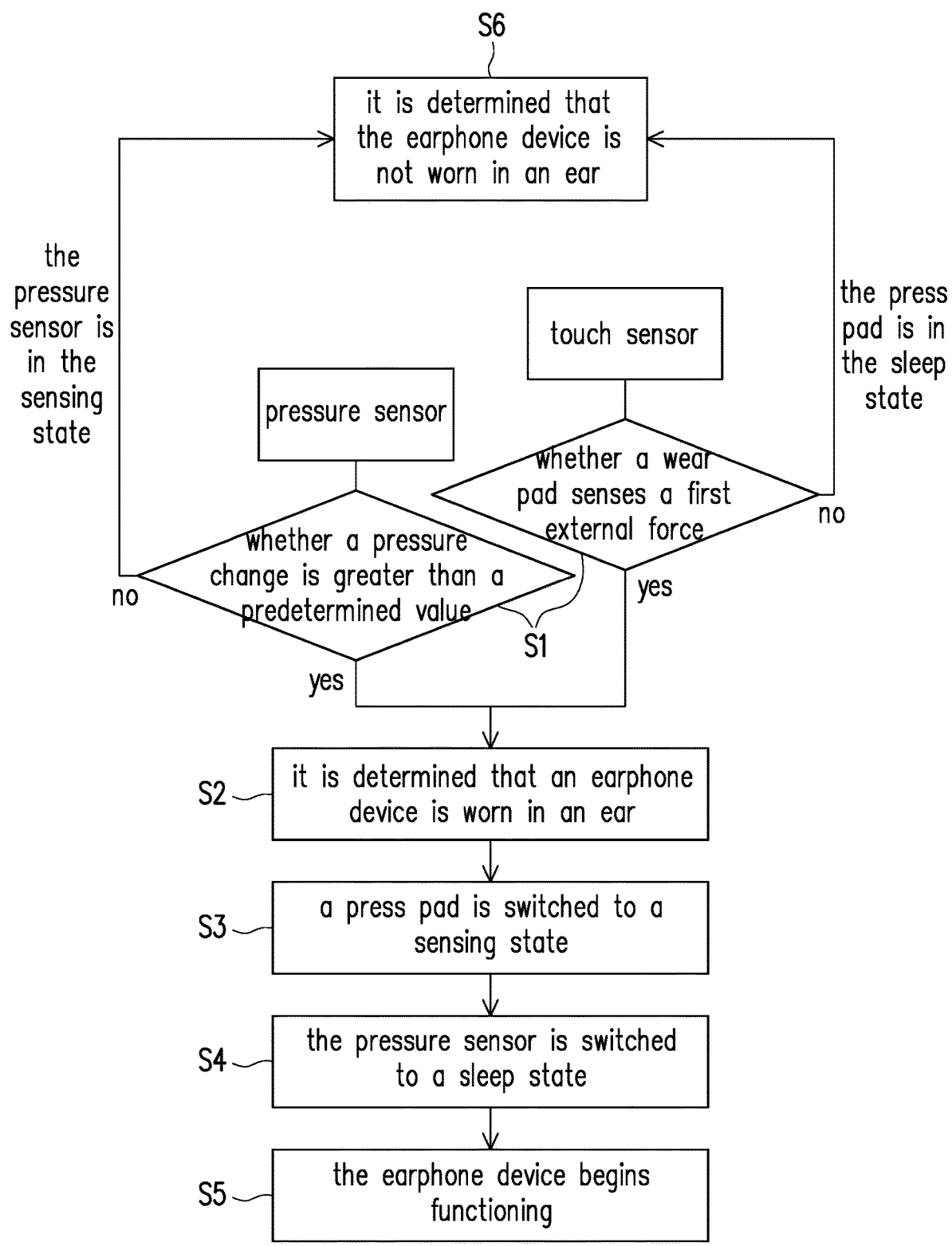
FIG. 2 is a flow chart of switching states detected by sensors in the earphone device of FIG. 1A.

FIG. 1A is a schematic plan view of an earphone device according to an embodiment of the disclosure. FIG. 1B is schematic block view of elements of the earphone device of FIG. 1A. FIG. 1C is a schematic three-dimensional view of the earphone device of FIG. 1A disposed in an ear. FIG. 2 is a flow chart of switching states detected by sensors in the earphone device of FIG. 1A.

With reference to FIG. 1A and FIG. 1C, an earphone device 100 provided by the disclosure is, for example, a wired earphone device or a wireless earphone device. A wired earphone device is connected to an external electronic apparatus (e.g., a Smartphone, a tablet computer, or other similar apparatuses) through a physical cable. A wireless earphone device is adapted to be wirelessly connected to an external electronic apparatus through wireless transmission technologies (e.g., WIFI, Bluetooth, or other similar technologies). The electronic apparatus transmits a control command and audio data to the earphone device through wireless transmission or wired transmission.

With reference to FIG. 1A and FIG. 1C, the earphone device 100 provided by the disclosure is exemplified as a wireless earphone device and includes a main body 110, a speaker 120, a control element 130, an antenna 140, a pressure sensor 150, and a touch sensor 160.

The main body 110 is a hollow shell-looking structure which matches a shape of an ear 200 of a user. The speaker 120 is disposed in the main body 110 to divide an internal chamber of the main body 110 into a front chamber FC and a rear chamber RC. The control element 130 is disposed in the rear chamber RC and includes a microcontroller 131 and a codec 132. The microcontroller 131 includes a central processing unit, a memory, a timer/counter, an input/output interface, etc. The codec 132 is coupled to the speaker 120 and the microcontroller 131 and is configured to perform conversion between a digital signal and an analog signal. The antenna 140 is coupled to the control element 130 and is configured to receive and transmit a wireless signal. Further, the antenna includes, for example, a monopole antenna, an inverted-F antenna, a loop antenna, or other types of antennas.

In this embodiment, the antenna 140 is adapted to receive digital audio data from an electronic apparatus, and the digital audio data is then transmitted from the microcontroller 131 to the codec 132. The codec 132 switches the received digital audio data to an analog audio signal, and a sound may thereby be outputted from the speaker 120.

The pressure sensor 150 is disposed in the front chamber FC and is coupled to the control element 130. The pressure sensor 150 is configured to sense a pressure change in the front chamber FC and accordingly generates a pressure-sensing signal. With reference to FIG. 1A, a distance D between the pressure sensor 150 and the speaker 120 is at least 1 mm, so that sound quality is prevented from being influenced. In other embodiments, the distance D may be changed according to design needs such as a volume of the earphone device 100. The pressure sensor 150 is coupled to the control element 130 through a flexible circuit board 190 to transmit the pressure-sensing signal to the microcontroller 131 of the control element 130 for performing signal interpretation.

The touch sensor 160 is disposed in the rear chamber RC, is coupled to the control element 130, is configured to sense a first external touch F1 applied to the main body 110, and accordingly generates a first trigger-sensing signal. With reference to FIG. 1C, additionally, the first external touch F1 is, for example, an external force of an inner wall IW of the ear 200 acting on a wear pad 161 of the touch sensor 160 when the earphone device 100 is worn in the ear 200. When being triggered by the first external touch F1, the touch sensor 160 changes a capacitance or resistance thereof. When the capacitance or the resistance is greater than or less than a predetermined value, the first trigger-sensing signal is triggered, and it can thus be determined that whether the wireless earphone is worn in an ear.

With reference to FIG. 1A to FIG. 1C, the earphone device 100 includes a sealing layer 170 and a mesh 180. The sealing layer 170 is surroundingly disposed between the speaker 120 and an inner surface IS of the main body 110, so that the front chamber FC and the rear chamber RC are not connected. The front chamber FC acts as a sound box resonating with the speaker 120, and the rear chamber RC is configured to load the control element 130.

The mesh 180 is disposed at a sound output hole SH of the main body 110, and the front chamber FC is connected to an external environment through the mesh 180. A sound wave SW of the speaker 120 is adapted to pass through the mesh 180 and the sound output hole SH from the front chamber FC. Air AR of the external environment is adapted to enter the front chamber FC from the mesh 180. Additionally, the mesh 180 exhibits acoustic impedance and may adjust properties of the sound wave SW such as a sound curve, an audio frequency, and sound quality.

The microcontroller 131 of the control element 130 automatically controls an action of the earphone device 100 according to the pressure-sensing signal and the first trigger-sensing signal, for example, turning on or off power of the earphone device 100, turning on or off the wireless transmission function of the earphone device 100, or a combination of the foregoing actions, but the disclosure is not limited thereto.

To be specific, the pressure sensor 150 is located between the mesh 180 and the speaker 120. When the earphone device 100 is worn in the ear 200, the air AR in the ear 200 fills the front chamber FC, so that a sudden gas pressure change occurs in the front chamber FC. When detecting that the gas pressure change is greater than a predetermined value, the pressure sensor 150 transmits the pressure-sensing signal. At the same time, the inner wall IW of the ear 200 acts on the wear pad 161 of the touch sensor 160, so that the first external touch F1 is generated and the first trigger-sensing signal is transmitted. When the pressure-sensing signal and the first trigger-sensing signal are transmitted to the control element 130 at the same time, it is certain that the earphone device 100 is worn in the ear 200. Through the dual-detection mechanism performed by the pressure sensor 150 and the touch sensor 160, a state in use by the earphone device 100 may be accurately sensed and misjudgment is thereby prevented. In addition, the pressure sensor 150 may also detect an altitude of the user when climbing a mountain or a height of a floor in a building where the user is located.

FIG. 2 is a flow chart of switching of the earphone device of FIG. 1A.

With reference to FIG. 1A to FIG. 1C and FIG. 2 together, the touch sensor 160 includes the wear pad 161 and a press pad 162. The wear pad 161 is disposed on a first outer surface ES1 of the main body 110 and is coupled to the microcontroller 131 of the control element 130, and the wear pad 161 is adjacent to the speaker 120 and the sealing layer 170. The press pad 162 is disposed on a second outer surface ES2 of the main body 110 and is coupled to the microcontroller 131 of the control element 130. Further, the first outer surface ES1 is located on a periphery of the main body 110 and is adapted to be in contact with the inner wall IW of the ear 200, and the second outer surface ES2 is located on a bottom of the main body 110 and is adapted to face an opening of the ear 200.

In step S1, when the first external touch F1 is applied to the wear pad 161, the touch sensor 160 is triggered by the wear pad 161, and the first trigger-sensing signal is transmitted to the microcontroller 131 of the control element 130. When the pressure change sensed by pressure sensor 150 is greater than a predetermined value and the first external touch F1 triggers the touch sensor 160, step S2 is performed, and the control element 130 determines that the earphone device 100 is worn in the ear 200. In step S3, the press pad 162 is switched to a sensing state through the microcontroller 131 of the control element 130. In step S4, the pressure sensor 150 is switched to a sleep state. In step S5, an action of the earphone device 100 is automatically controlled, and the earphone device 100 begins functioning.

For instance, after the pressure sensor 150 is switched from the sensing state to the sleep state, a current required during standby may be reduced from 300μA to 2μA, so that a power saving effect is achieved. Moreover, when a second external force F2, such as an external force generated by pressing of a finger, is applied to the press pad 162, the touch sensor 160 is triggered by the press pad 162, and a second trigger-sensing signal is transmitted to the microcontroller 131 of the control element 130 to operate the earphone device 100.

Additionally, the press pad 162 may be configured for performing functions such as switching the volume of the earphone device 100, answering the phone, selecting the next song, or switching to a listening to music mode or a talk mode.

With reference to FIG. 2, in step S1, when the pressure change sensed by the pressure sensor 150 is less than a predetermined value or the touch sensor 160 is not triggered by the wear pad 161, step S6 is performed instead. It is determined that the earphone device 100 is not worn in the ear 200 of the user, and the press pad 162 is switched to the sleep state by the control element 130. For instance, after the press pad 162 of the touch sensor 160 is switched from the sensing state to the sleep state, a current required during standby of the press pad 162 is reduced from 150μA to 2μA, and the pressure sensor 150 maintains in the sensing state. Through the determination manner provided in step S1, it is ensured that the press pad 162 may function only after the earphone device 100 is worn in the ear 200 of the user. In this way, the earphone device 100 is prevented from being accidentally touched in a static state, and the effect of power saving may thus be achieved.

For instance, the pressure sensor 150 maintains in the sensing state, and the current required during standby of the pressure sensor 150 is 300μA. Since the wear pad 161 of the touch sensor 160 has to detect the first external touch F1 instantaneously, the wear pad 161 maintains in the sensing state, and a standby current required by the wear pad 161 is 15μA.

For instance, when a finger of the user accidentally touches the wear pad 161 of the touch sensor 160, the first external touch F1 is applied to the wear pad 161 of the touch sensor 160, and the first trigger-sensing signal is triggered and transmitted to the control element 130. At the same time, since there is no sudden increase of the air AR in the front chamber FC, the pressure change sensed by the pressure sensor 150 is less than the predetermined value, so that the pressure-sensing signal is not triggered. In this case, the control element 130 determines that the earphone device 100 is not worn in the ear 200 of the user.

Alternatively, when a position at which the user grabs the earphone device 100 is close to the sound output hole SH, the external air AR is poured into the front chamber FC of the main body 110 from the sound output hole SH. In this case, the pressure change sensed by the pressure sensor 150 is greater than the predetermined value, so that the pressure-sensing signal is triggered and transmitted to the control element 130. Nevertheless, the wear pad 161 of the touch sensor 160 does not sense the first external touch F1. In this case, the control element 130 may still determine that the earphone device 100 is not worn in the ear 200 of the user.

Since only when the pressure-sensing signal and the first trigger-sensing signal provided by the earphone device 100 of the disclosure are simultaneously triggered does the control element 130 determines that the earphone device 100 is worn in the ear 200, the state in use by the earphone device 100 is prevented from being misjudged owing to interference caused by human factors or environmental factors.

In view of the foregoing, the earphone device provided by the disclosure includes the pressure sensor and the touch sensor, so that the pressure change in the front chamber and the first external touch applied to the main body may be simultaneously sensed and are converted into the pressure-sensing signal and the first trigger-sensing signal. The control element receives and reads the pressure-sensing signal and the first trigger-sensing signal, and when a predetermined condition is satisfied, the control element automatically controls an action of the earphone device. When one of the pressure-sensing signal and the first trigger-sensing signal does not satisfy the predetermined condition, an original state is maintained. In the disclosure, through the dual-detection mechanism performed by the pressure sensor and the touch sensor, the environment may be accurately sensed and misjudgment on a state in use by the earphone device is prevented.

Further, in the earphone device provided by the disclosure, the pressure sensor and the touch sensor determine whether the earphone device is worn in an ear. The states detected by the sensors are then automatically switched, and in this way, the power saving effect is achieved. For instance, when the earphone device is in the static state, the standby current of the wear pad of the touch sensor is 15μA, the press pad of the touch sensor is in the sleep state, and the standby current of the press pad is 2μA. The pressure sensor is in the sensing state, and the standby current of the pressure sensor is 300μA. It thus can be seen that total power consumption of the earphone device is 317μA. When the earphone device is worn in an ear, the press pad of the touch sensor is switched to the sensing state, and the standby current of the press pad is 150μA. The pressure sensor is switched to the sleep state, and the standby current of the pressure sensor is 2μA. The standby current of wear pad of the touch sensor is 15μA. It thus can be seen that the total power consumption of the earphone device is 167μA. Therefore, the earphone device provided by the disclosure is capable of achieving the effect of power consumption reduction.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An earphone device, comprising:
   a main body;
   a speaker, disposed in the main body for dividing the main body into a front chamber and a rear chamber;
   a control element, disposed in the rear chamber;
   a pressure sensor, disposed in the front chamber, coupled to the control element, configured to sense a pressure change in the front chamber, and accordingly generating a pressure-sensing signal; and
   a touch sensor, disposed in the rear chamber, coupled to the control element, configured to sense a first external touch applied to the main body, and accordingly generating a first trigger-sensing signal, wherein the touch sensor further comprises a wear pad disposed on a first outer surface of the main body and configured to contact a user's ear when the user wears the earphone device, and the touch sensor is triggered by the wear pad and the first trigger-sensing signal is transmitted to the control element when the first external touch is applied to the wear pad by contacting the user's ear;
   wherein the control element automatically controls an action of the earphone device according to the pressure-sensing signal and the first trigger-sensing signal.

2. The earphone device as claimed in claim 1, wherein the pressure sensor is coupled to the control element through a flexible circuit board to transmit the pressure-sensing signal to the control element.

3. The earphone device as claimed in claim 1, wherein the touch sensor further comprises a press pad disposed on a second outer surface of the main body and coupled to the control element.

4. The earphone device as claimed in claim 3, wherein a microcontroller of the control element switches the press pad to a sensing state and the pressure sensor to a sleep state when the pressure change sensed by the pressure sensor is greater than a predetermined value and the first external touch triggers the touch sensor.

5. The earphone device as claimed in claim 4, wherein the touch sensor is triggered by the press pad and a second trigger-sensing signal is transmitted to the control element when a second external touch is applied to the press pad for operating the earphone device.

6. The earphone device as claimed in claim 3, wherein a microcontroller of the control element switches the press pad to a sleep state and the pressure sensor to a sensing state when the pressure change sensed by the pressure sensor is less than a predetermined value or the touch sensor is not triggered.

7. The earphone device as claimed by claim 1, further comprising a sealing layer, surroundingly disposed between the speaker and an inner surface of the main body so that the front chamber and the rear chamber are not connected.

8. The earphone device as claimed by claim 1, further comprising a mesh disposed at a sound output hole of the main body, wherein the front chamber is connected to an external environment through the mesh, a sound wave of the speaker is adapted to pass through the mesh and the sound output hole from the front chamber, and air of the external environment is adapted to enter the front chamber from the mesh.

9. The earphone device as claimed in claim 1, wherein a distance between the pressure sensor and the speaker is at least 1 mm.

* * * * *